United States Patent [19]
Scalise

[11] Patent Number: 5,362,187
[45] Date of Patent: Nov. 8, 1994

[54] RELEASABLE LOCKING FASTENER
[76] Inventor: Dane C. Scalise, 223 South St., Apt. 2, Jamaica Plain, Mass. 02130
[21] Appl. No.: 970,773
[22] Filed: Nov. 3, 1992
[51] Int. Cl.⁵ .................................. F16B 21/00
[52] U.S. Cl. ..................... 411/555; 411/350
[58] Field of Search .......... 411/555, 554, 350, 549, 411/551, 338, 105

[56] References Cited
U.S. PATENT DOCUMENTS

| | | |
|---|---|---|
| 808,867 | 1/1906 | Perry . |
| 1,176,619 | 3/1916 | Sykes . |
| 1,259,214 | 3/1918 | De Roja .................. 411/338 |
| 1,480,839 | 1/1924 | Robinson . |
| 2,470,344 | 5/1949 | Dzus ...................... 411/350 X |
| 3,407,454 | 10/1968 | Myatt .................... 411/549 |
| 3,656,466 | 4/1972 | Dzus, Jr. ................ 411/555 X |
| 3,874,041 | 4/1975 | Smith .................... 411/555 |
| 4,067,090 | 1/1978 | Schenk ................... 411/554 |
| 4,276,806 | 7/1981 | Morel .................... 411/41 |
| 4,375,342 | 3/1983 | Wollar et al. ............ 411/41 |
| 4,397,061 | 8/1983 | Kanzaka .................. 16/2 |
| 4,653,970 | 3/1987 | Ballantyne .............. 411/555 |
| 4,761,860 | 8/1988 | Krauss ................... 24/142 |
| 4,777,704 | 10/1988 | Acker .................... 24/106 |
| 4,832,551 | 5/1989 | Wollar ................... 411/280 |
| 4,874,276 | 10/1989 | Iguchi ................... 411/48 |
| 5,011,356 | 4/1991 | Fernandez ................ 411/553 |

FOREIGN PATENT DOCUMENTS
1004258  9/1965  United Kingdom ................ 411/554

Primary Examiner—Rodney M. Lindsey
Attorney, Agent, or Firm—Weingarten, Schurgin, Gagnebin & Hayes

[57] ABSTRACT

A fastener is provided having a bolt releasably securable to a nut. The bolt includes a collar and resilient locking prongs with shoulders to anchor the bolt to a first member, such as a grommet or panel, and the nut has a nut body and resilient locking prongs with shoulders to anchor the nut to a second body, such as a second grommet or panel. A bolt shank having several curved channels open at one end and having locking slots at the other end is insertable into a cavity in the nut which has engagement lugs disposed therein. Rotation of either the nut or the bolt causes the engagement lugs to travel within the channels and engage the locking slots, thereby securing the nut to the bolt. Either a spring washer or resilient collar material can be used to apply a locking force to urge the nut and bolt in opposite directions to ensure that the lugs remain in the locking slots. Pressing the lug and nut together with an unlocking force greater than the locking force allows the nut and bolt to disengage.

19 Claims, 4 Drawing Sheets

RELEASABLE LOCKING FASTENER

FIELD OF THE INVENTION on relates to a multiple piece fastener, and more particularly to a two-piece, releasably locking fastener for securing two objects together.

BACKGROUND OF THE INVENTION

Fasteners in seemingly endless varieties exist to attach one object to another. It is often desirable to effect a temporary connection between, for instance, separate pieces of fabric or leather having grommets, or between a tarpaulin and a truck bed. This connection may be effected by a temporary fastener, a permanent fastener having pieces affixed to each object to be joined, or by passing the fastener through the objects to be joined and into a substrate. The fastener can be used to form a one-time connection or be repeatedly engaged and disengaged.

Unfortunately, the need for permanent fasteners requires forethought and anticipation of a specific application. Additionally, permanent fasteners are exceedingly difficult to replace if defective or broken in use. A temporary fastener is a versatile alternative to the permanent fastener. The classic temporary, add-on fastener, a threaded bolt, nut, and washer, is easily replaced and provides a more secure attachment than a snap fastener for example, which is prone to "popping apart" under stress. However, nuts, washers, and bolts are easy to misplace when separated, and are relatively tedious and slow to connect. While add-on or aftermarket fasteners have a flexibility of use advantage over permanent fasteners, the features which make pieces of the fasteners easily securable to each item to be joined also make the pieces easy to lose, especially when the items are disconnected from each other.

An example of a specialized temporary fastener is U.S. Pat. No. 4,777,704 to Acker which teaches a snap fastener that uses a specialized grommet to attach layers of fabric to each other. However, in use, the pieces of the Acker device would be easily misplaced. U.S. Pat. Nos. 5,011,356 to Fernandez: 4,874,276 to Iguchi; 4,375,342 to Wollar et al.; and 4,276,806 to Morel each depict two-piece fasteners wherein a first fastening piece is anchored to a first object and is matable with a second fastening piece that secures a second object to the first object, but is not itself anchored to the second object in a manner that will prevent its disengagement or loss when the fastener is in a disengaged state.

Of the seemingly endless varieties of fasteners, there is no single fastener or combination of fasteners which simply and reliable join a plurality of annular members, such as eyelets, grommets or the like to one another. Further, the fastener art lacks fasteners that can be securely affixed to the members to be joined so that objects attached to the members can be connected and disconnected repeatedly without losing one or both of the fastening pieces.

SUMMARY OF THE INVENTION

The present invention provides a fastener of simple and inexpensive construction that has two pieces which easily attach and detach from each other for securing two members to each other, while remaining anchored to their respective members.

In one embodiment, a first piece including a bolt having resilient locking prongs extending from a collar and a shank having open-ended channels with locking slots is matable with a second piece. The second piece includes a nut body having a central cavity open to receive the shank of the bolt and resilient locking prongs. The cavity has engagement lugs disposed therein to mate with the channels and be locked within the locking slots. The collar can include a resilient surface or spring washer t,D maintain locking tension between the nut and the bolt which must be overcome to unlock them.

In another embodiment, a two-piece fastening system includes first and second members having holes therethrough. A first fastening piece includes a bolt having resilient locking prongs extending from a collar and further includes a shank having open-ended channels with locking slots is matable with a second fastening piece. The second fastening piece includes a nut body having a central cavity open to receive the shank of the bolt and resilient locking prongs. The cavity has engagement lugs disposed therein to mate with the channels and to be locked within the locking slots. The collar can include a resilient surface or spring washer to maintain locking tension between the nut and the bolt which must be overcome to unlock them. Insertion of the locking prongs of the bolt into the hole of the first members causes bolt shoulders to engage one side of the first member and the collar to engage the other, thereby anchoring the bolt to the first member. Insertion of the locking prongs of the nut into the hole of the second member causes the nut shoulders to engage one side of the second member and the nut body to engage the other, thereby anchoring the nut to the second member. Insertion of the shank into the cavity to cause the engagement lugs to lock into the locking slots locks the nut to the bolt and therefore the first member to the second member.

BRIEF DESCRIPTION OF THE DRAWINGS

These and further features of the invention will be better understood with reference to the accompanying specification and the drawings in which.

DETAILED DESCRIPTION OF THE INVENTION

Figure 1:
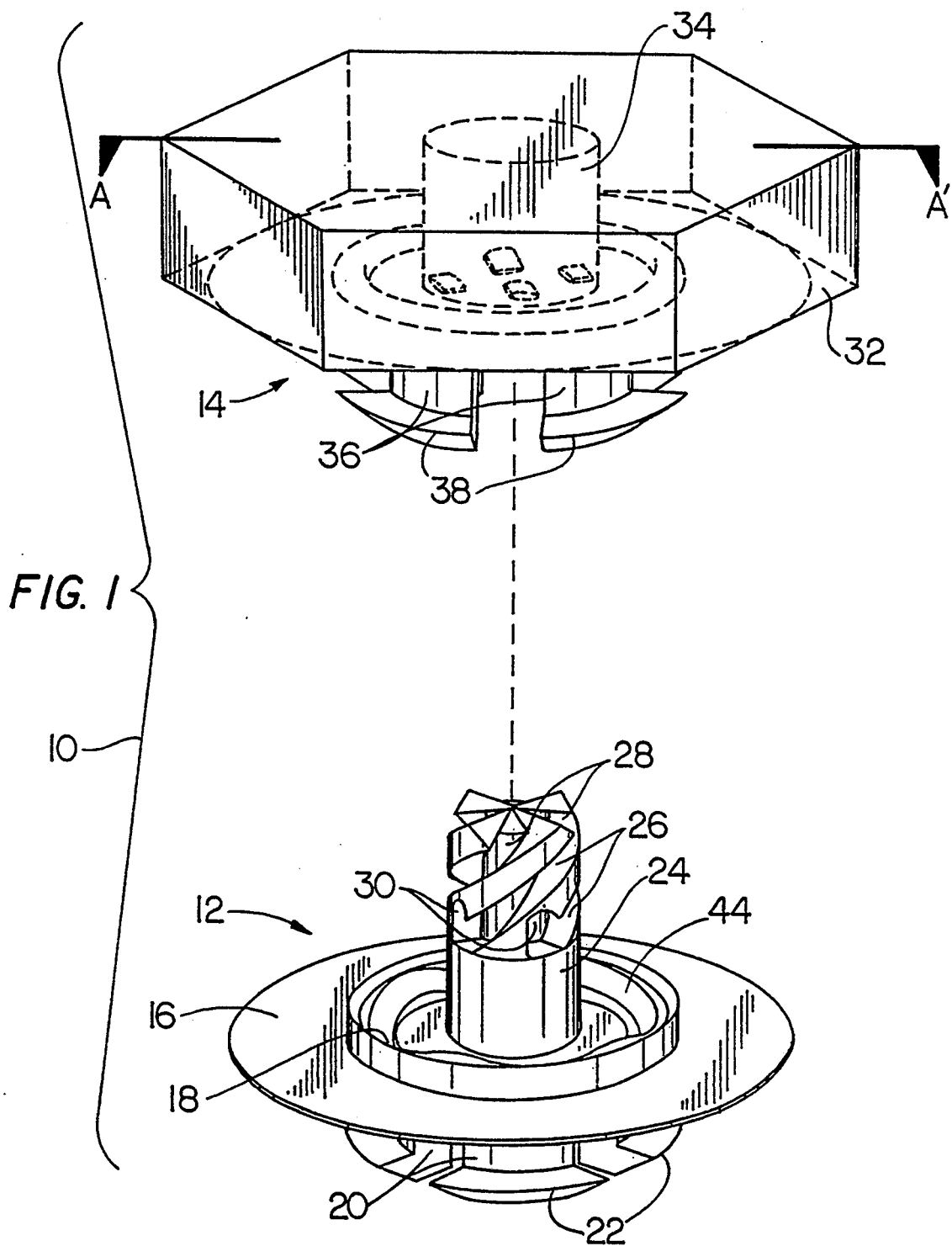
FIG. 1 is an exploded perspective view of the fastener of the invention having a nut and a bolt.

Referring to FIG. 1, an exploded perspective view of a fastener 10 is shown. The fastener has two pieces: a first fastening piece or bolt 12, and a second fastening piece or nut 14, each of which is a single piece of a resilient material such as plastic, a memory metal, a composite or the like.

The bolt 12 has a collar 16 which extends orthogonally outward from a central axis and includes a raised resilient surface 18. Resilient bolt locking prongs 20, attached to one side of the collar 16 at one end and having bolt shoulders 22 at the other end extend longitudinally from the collar 16. Each of the resilient bolt locking prongs 20 are sufficiently separated from each other so that they can be simultaneously pressed inward toward the central axis to reduce the circumference of the outermost edge of the bolt shoulders 22. A bolt shank 24 having channels 26 therein extends axially from the other side of the collar 16. Each of the channels 26 has an opening 28 at one end and a locking slot 30 at a second end for mating with the nut 14 as discussed hereinafter.

The nut 14 is comprised of a nut body 32 having a cavity 34 centrally disposed and accessible from the top and/or bottom of the nut body 32. In FIG. 1, the cavity 34 in the nut body 32 is only open from the bottom. Resilient nut locking prongs 36, extend longitudinally from the nut body 32 and are attached to the bottom of the nut body 32. The free end of each locking prong has a nut shoulder 38. Each of the resilient nut locking prongs 36 are sufficiently separated from each other so that they may be simultaneously pressed inward toward the central axis to reduce the circumference of the outermost edge of the nut shoulders 38. The nut locking prongs are also sufficiently separated from each other to permit passage of the bolt shank 24 into the cavity 34.

Figure 2:
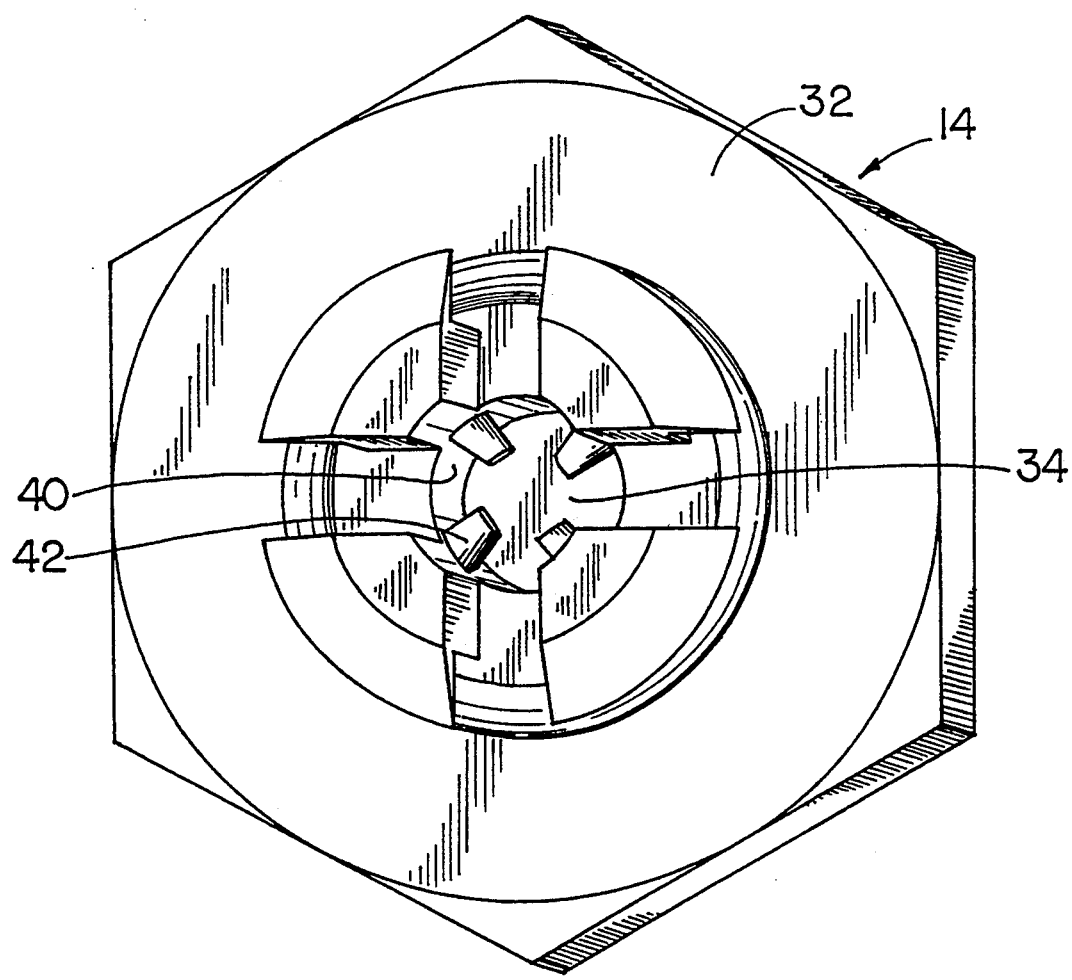
FIG. 2 is a perspective view of an interior cavity in the bolt of the fastener of FIG. 1.

FIG. 2 is a perspective view of the interior of the cavity 34 in the nut body 32 of FIG. 1. The cavity has a cylindrical side wall 40. Engagement lugs 42 project therefrom and are configured to be inserted into the opening 28 of the bolt shank 24, guided within the channels 26, and locked within the locking slots 30 when the nut 14 and bolt 12 are pressed together and rotated with respect to each other. With this configuration, the nut 14 and bolt 12 can be locked together with a 90 degree rotation. While four engagement lugs 42, channels 26, engagement lugs 42, and locking slots 30 are illustrated in FIGS. 1 and 2, other numbers of engagement lugs 42 are equally compatible with the concept of the invention. For example, the channels 26 can be axial with a bayonet type locking mechanism.

Figure 3:
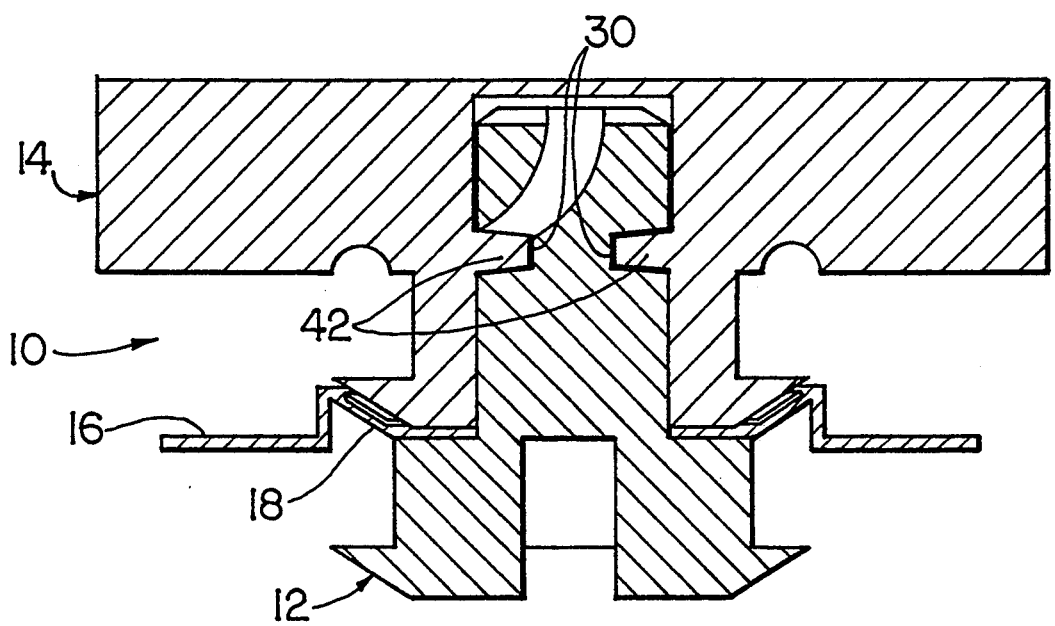
FIG. 3 is a side sectional view of the fastener of FIG. 1 taken along the line A-A' with the nut and bolt mated.

FIG. 3 is a side sectional view of the fastener 10 of FIG. 1 taken along the line A-A' with the nut 14 and bolt 12 mated. In this view, two of the engagement lugs 42 are shown locked in place within the locking slots 30. When the fastener 10 is mated, the nut shoulders 38 press against the resilient surface 18 of the collar 16 to provide a locking force that hold the engagement lugs 42 within an upper portion of the locking slots 30. If the nut 14 and bolt 12 are pressed together with sufficient force to overcome the locking force, the applied force is an unlocking force which deforms the resilient surface 18 enough to allow the engagement lugs 42 to disengage from the locking slots 30. The resilient surface 18 of the collar 16 can be supplemented or replaced by a spring washer 44 (shown in FIG. 1).

Figure 4:
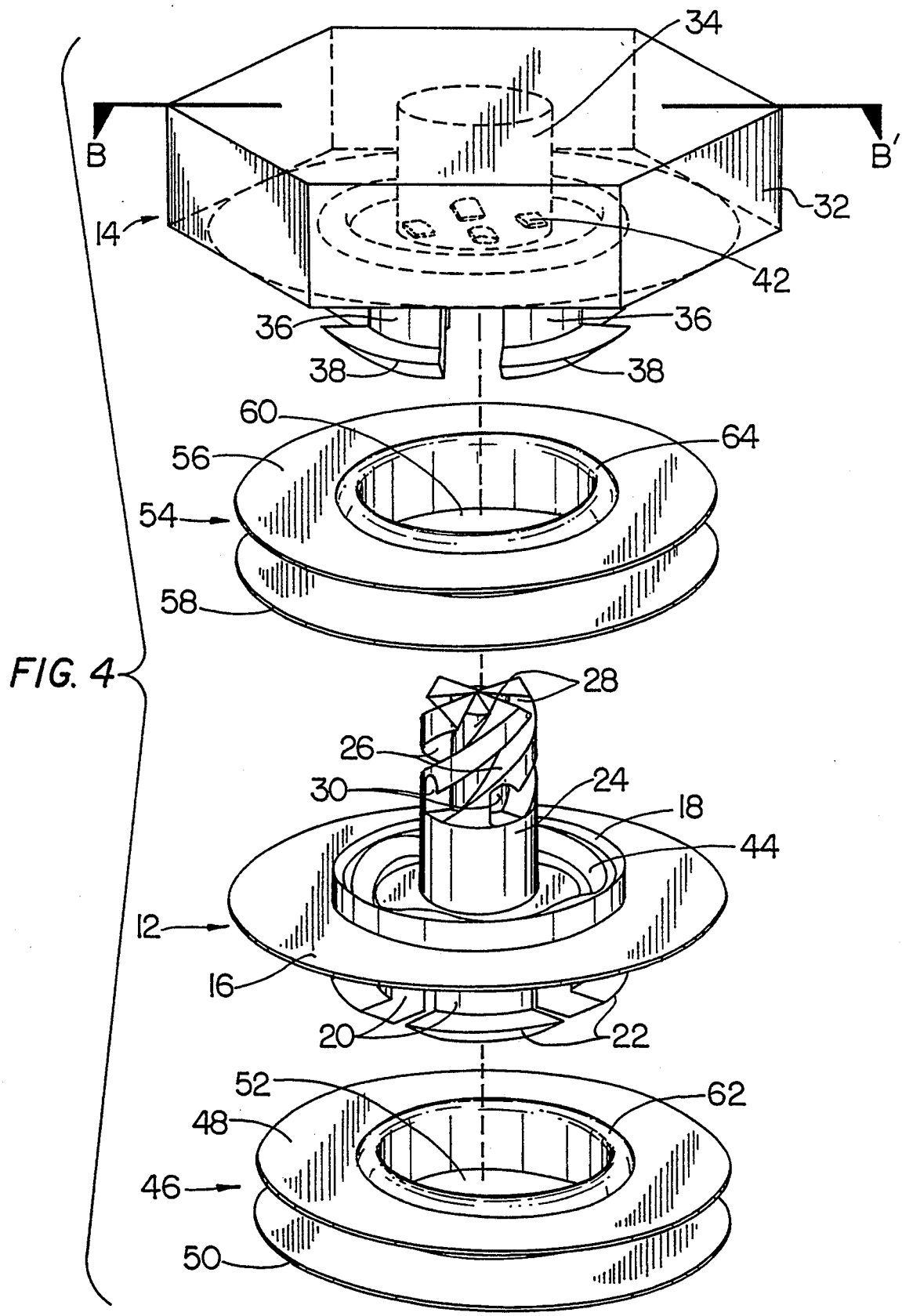
FIG. 4 is an exploded side view of the nut and bolt of FIG. 1 aligned with a first and second member to be joined.

FIG. 4 is an exploded side view of the nut 14 and bolt 12 of FIG. 1 aligned with a first member 46 having a first side 48, a second side 50, and a hole 52 therebetween; and a second member 54 having a first side 56, a second side 58, and a hole 60 therebetween. Although each member 46, 54 as shown, is a grommet, it will be appreciated that such members can be an annulus, eyelet, washer, panel, circuit board or the like, or any combination thereof. The fastener 10 can be dimensioned during fabrication for specific hole sizes or holes can be created in a particular surface in accordance with the dimension of the fastener 10. In the embodiment of FIG. 4, each grommet has a raised lip, 62 and 64, respectively.

Joining the first grommet 46 to the second grommet 54 with the fastener 10 is a simple multi-step, procedure wherein each fastener piece is attached to a grommet following which the fastener pieces are mated. Specifically, the bolt 12 is axially aligned with the hole 52 in the first grommet 46. The bolt shoulders 22 are pressed against the first side 48 of the first grommet 46 so that the curvature of the bolt shoulders 22 causes the bolt locking prongs 20 to compress toward the central bolt axis thereby allowing bolt shoulders 22 of a greater circumference in their non-compressed state than the circumference of the hole 52 to be able to pass through the hole 52. Pushing the collar 16 adjacent the first side 48 of the first grommet 46 allows the bolt shoulders 22 to exit the hole 52 and decompress so that their circumference is greater than that of the hole 52 and so that the flat portion of the bolt shoulder 22 is adjacent the second side 50 of the first grommet 46. Thus, unless the bolt locking prongs 20 are recompressed, the bolt 12 is anchored to the first grommet 46.

The same procedure is then repeated for the nut 14 and the second grommet 54. Specifically, the nut body 32 is axially aligned with the hole 60 in the second grommet 54. The nut shoulders 38 are pressed against the first side 56 of the second grommet 54 so that the curvature of the nut shoulders 38 causes the nut locking prongs 36 to compress toward the central nut axis, thereby allowing nut shoulders 38 of a greater circumference in their non-compressed state than the circumference of the hole 60 to be able to pass through the hole 60. Pushing the nut body 32 adjacent the first side 56 of the second grommet 46 allows the nut shoulders 38 to exit the hole 60 and decompress so that their circumference is greater than that of the hole 60, and so that the flat portion of the nut shoulder 38 is adjacent the second side 60 of the second grommet 54. Thus, unless the nut locking prongs 38 are re-compressed, the nut 14 is anchored to the second grommet 54.

Locking the first grommet 46 to the second grommet 54 is accomplished by aligning the bolt shank 24 with the cavity 34 and pressing the nut 14 and bolt 12 toward each other. As the bolt shank 24 enters the cavity 34, the engagement lugs 42 enter the openings 28 in the channels 26. Rotating the nut 14 with respect to the bolt 12 causes the engagement lugs 42 to be guided through the channels 26 until the engagement lugs 42 approach the locking slots 30. As the nut 14 and bolt 12 move together, the nut shoulders 38 press against the resilient surface 18 or spring washer 44 of the collar 16 and a compressive force overcomes the resistance of the resilient surface 18 or the spring washer 44, thereby allowing the engagement lugs 42 to enter the locking slots 30. Once the engagement lugs 42 are in place in the locking slots 30, they are held in position by the tension created between the resilient surface 18 or locking washer 44 and the nut shoulders 38, unless a compressive unlocking force is applied to the bolt 12 and nut 14 which allows the engagement lugs 42 to disengage from the locking slots 30.

Figure 5:
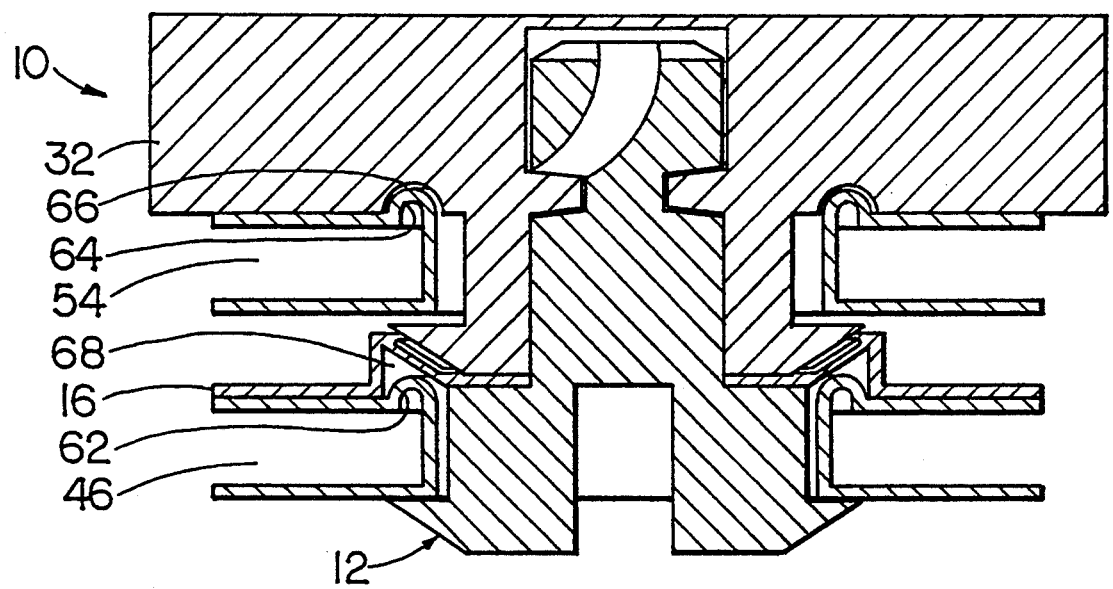
FIG. 5 is a side sectional view of the mated fastener and joined members of FIG. 4 taken along the line B-B'.

Referring to FIG. 5, a side sectional view of the mated fastener 10 and joined members 46, 54 of FIG. 4 is shown taken along the line B-B'. In this view the nut body 32 is shown with an optional contoured grove 66 for covering the lip 64 of the second grommet 54 to allow the nut body 32 to lie flush over the remainder of the second grommet 54, and for preventing a pressure point against the nut body 32 which could cause it to crack. A similar feature is shown in the bolt 12, wherein the collar 16 has a hollow area 68 under the raised resilient surface 18 for receiving the lip 62.

Figure 6:
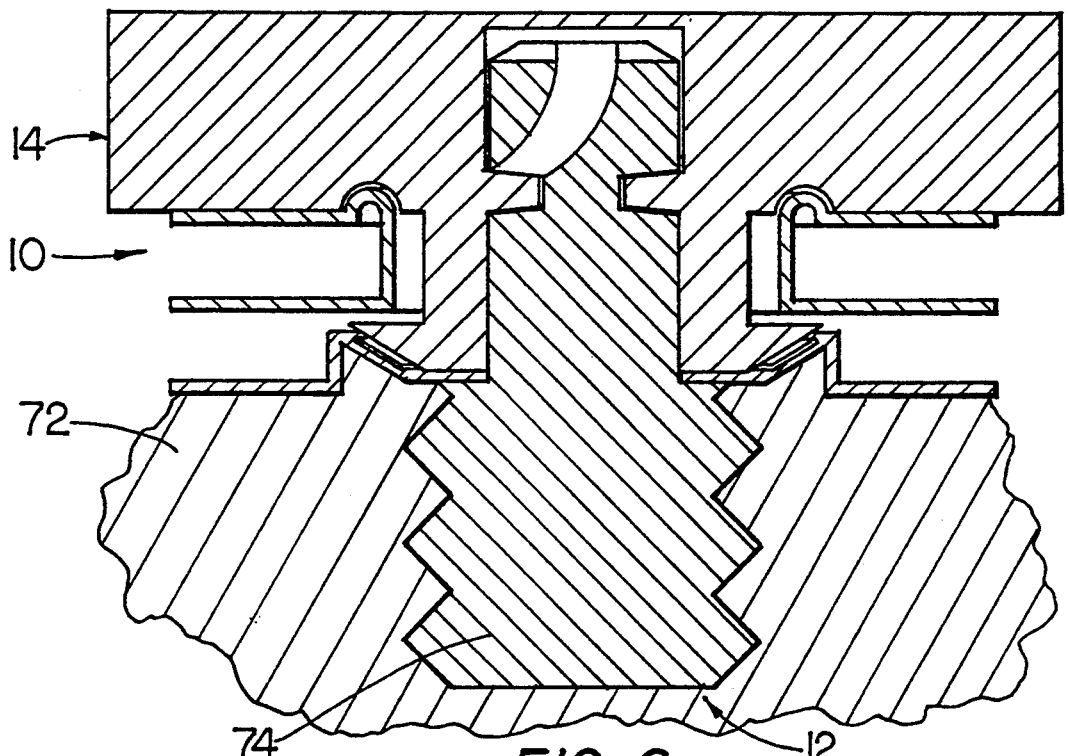
FIG. 6 is a side sectional vie, of a mated fastener having a bolt with a threaded base.

The fastener 10 is also very useful for securing a member 70 to a fixed substrate 72 as illustrated is FIG. 6, wherein a side sectional view of a mated fastener 10 having a bolt 12 with a threaded base 74 is shown. The threaded base 74 screws into the substrate and forms a fixed anchor to which the bolt 14 is mated.

Although a two-piece fastener is described herein as an exemplary embodiment according to the invention, one of ordinary skill in the art will appreciate that a fastener according to the invention can be implemented having a greater number of pieces such as three or more.

While a nut portion of the fastener is described and illustrated herein as an hexagonal nut, it will be appreciated that other configurations can be implemented in a fastener according to the invention, including other geometric configurations, i.e. octagonal or square, and wing-nut-like implementations, or the like. Further, while the channels on the bolt shaft herein are described and illustrated as arcuate or curved channels, it will be appreciated that such channels could be straight or otherwise inclined.

It will be further appreciated, among other things, that although the engagement lugs are disposed on the nut portion of the exemplary fasteners described, and the arcuate or curved channels are disposed on the bolt shank in the illustrative embodiments, the channels can alternatively be integrated with the nut portion and the engagement lugs disposed on the bolt shank.

While illustrative embodiments according to the invention are described and illustrated herein having annular features for engagement with grommets, eyelets, washers and the like, it will be appreciated that a fastening system can be implemented according to the invention wherein other geometries are incorporated, such as square or rectangular features.

Although the invention has been shown and described with respect to exemplary embodiments thereof, various other changes, omissions and additions in form and detail thereof may be made therein without departing from the spirit and scope of the invention.

What is claimed is:

1. A two-piece fastener comprising:
   a first fastening piece comprising,
       a bolt having a collar, said collar having a first side and a second side;
       a plurality of resilient bolt locking prongs integral with said collar and extending longitudinally from said second side of said collar, each of said plurality of resilient bolt locking prongs including an outwardly facing surface having a slope; and
       a bolt shank integral with said collar and extending from said first side of said collar, said bolt shank having a plurality of channels therein, each of said plurality of channels having a first end and a second end, and having an opening at said first end and a locking slot at said second end; and
   a second fastening piece matable with said first fastening piece comprising,
       a nut including a nut body, said nut body having a first side and a second side, and a cavity centrally disposed in said first side for receiving said bolt shank;
       a plurality of resilient nut locking prongs integral with said nut and extending longitudinally from said second side of said nut body, each of said plurality of resilient nut locking prongs including an outwardly facing surface having a slope; and
       a plurality of engagement lugs disposed within said cavity in said nut body, said plurality of engagement lugs adapted to slide within said plurality of channels of said bolt shank and engage said locking slot.

2. A two-piece fastener comprising:
   a first fastening piece comprising,
       a bolt having a central axis and including a collar thereabout and extended orthogonally with respect thereto;
       a plurality of resilient bolt locking prongs extending longitudinally from said collar of said bolt and parallel to said central axis, each of said plurality of resilient bolt locking prongs having a first end attached to said collar and a second end having a bolt shoulder; and
       a bolt shank extending axially from said collar, said bolt shank having a plurality of channels therein, each of said plurality of channels having a first end and a second end, and having an opening at said first end and a locking slot at said second end; and
   a second fastening piece matable with said first fastening piece in alignment with said central axis and comprising,
       a nut including a nut body, said nut body having a first side and a second side, and a cavity centrally disposed in at least one of said first side and said second side for receiving said bolt shank;
       a plurality of resilient nut locking prongs extending longitudinally from said nut body parallel to said central axis, each of said plurality of resilient nut locking prongs having a first end attached to said nut body and a second end having a nut shoulder; and
       a plurality of engagement lugs disposed within said cavity in said nut body, said plurality of engagement lugs adapted to slide within said plurality of channels of said bolt shank and engage said locking slot;
   wherein said collar further comprises a resilient surface deformed by said nut shoulder upon said first fastening piece and said second fastening piece being locked together, said resilient surface providing a locking force that urges said nut and said bolt away from each other to prevent each of said plurality of engagement lugs from disengaging from said locking slot, wherein an unlocking force that urges said nut and said bolt toward each other and which is greater than said locking force, permits each of said plurality of engagement lugs to be disengaged from said locking slot.

3. A two-piece fastener comprising:
   a first fastening piece comprising,
       a bolt having a central axis and including a collar thereabout and extended orthogonally with respect thereto;
       a plurality of resilient bolt locking prongs extending longitudinally from said collar of said bolt and parallel to said central axis, each of said plurality of resilient bolt locking prongs having a first end attached to said collar and a second end having a bolt shoulder; and a bolt shank extending axially from said collar, said bolt shank having a plurality of channels therein, each of said plurality of channels having a first end and a second end, and having an opening at said first end and a locking slot at said second end; and a second fastening piece matable with said first fastening piece in alignment with said central axis and comprising, a nut including a nut body, said nut body having a first side and a second side, and a cavity centrally disposed in at least one of said first side and said second side for receiving said bolt shank;

a plurality of resilient nut locking prongs extending longitudinally from said nut body parallel to said central axis, each of said plurality of resilient nut locking prongs having a first end attached to said nut body and a second end having a nut shoulder; and a plurality of engagement lugs disposed within said cavity in said nut body, said plurality of engagement lugs adapted to slide within said plurality of channels of said bolt shank and engage said locking slot; and a spring washer on said collar and disposed around said bolt shank between said collar and said nut shoulder, said spring washer providing a locking force that urges said nut and said bolt away from each other to prevent each of said plurality of engagement lugs from disengaging from said locking slot, wherein an unlocking force that urges said nut and said bolt toward each other and which is greater than said locking force, permits each of said plurality of engagement lugs to be disengaged from said locking slot.

4. The fastener of claim 1, wherein said plurality of channels are curved so that rotation of said bolt and said nut relative to each other causes them to be pulled together.

5. A two-piece fastening system comprising:

a first member and a second member, each said first member and said second member having a hole therethrough, and having a first side and a second side;

a first fastening piece comprising, a bolt having a collar, said collar having a first side and a second side;

a plurality of resilient bolt locking prongs integral with said collar and extending longitudinally from said second side of said collar, each of said plurality of resilient bolt locking prongs including an outwardly facing surface having a slope; and a bolt shank integral with said collar and extending from said first side of said collar, said bolt shank having a plurality of channels therein, each of said plurality of channels having a first end and a second end, and having an opening at said first end and a locking slot at said second end; and a second fastening piece matable with said first fastening piece comprising, a nut including a nut body, said nut body having a first side and a second side, and a cavity centrally disposed in said first side for receiving said bolt shank;

a plurality of resilient nut locking prongs integral with said nut and extending longitudinally from said second side of said nut body, each of said plurality of resilient nut locking prongs including an outwardly facing surface having a slope; and a plurality of engagement lugs disposed within said cavity in said nut body, said plurality of engagement lugs adapted to slide within said plurality of channels of said bolt shank and engage said locking slot.

6. The fastening system of claim 5, wherein said collar further comprises a resilient surface deformed by said nut locking prongs, said resilient surface providing a locking force that urges said nut and said bolt away from each other to prevent each of said plurality of engagement lugs from disengaging from said locking slot, wherein an unlocking force that urges said nut and said bolt toward each other and which is greater than said locking force, permits each of said plurality of engagement lugs to be disengaged from said locking slot.

7. The fastening system of claim 5, further comprising a spring washer on said collar and disposed around said bolt shank between said collar and said nut locking prongs, said spring washer providing a locking force that urges said nut and said bolt away from each other to prevent each of said plurality of engagement lugs from disengaging from said locking slot, wherein an unlocking force that urges said nut and said bolt toward each other and which is greater than said locking force, permits each of said plurality of engagement lugs to be disengaged from said locking slot.

8. The fastening system of claim 5, wherein said plurality of channels are curved so that rotation of said bolt and said nut relative to each other causes them to be pulled together.

9. The fastening system of claim 5, wherein said first member and said second member are annular.

10. The fastening system of claim 5, wherein sad first member and said second member are grommets.

11. The fastening system of claim 5, wherein said first member and said second member are eyelets.

12. The fastening system of claim 5, wherein said first member and said second member are washers.

13. The fastening system of claim 5, wherein said first member and said second member are panels.

14. The fastening system of claim 5, wherein said first member and said second member are circuit boards.

15. The fastening system of claim 5, wherein said first fastening piece and said second fastening piece are rotatable within said hole in said first member and said hole in said second member, respectively, when anchored thereto.

16. The fastening system of claim 5, wherein one of said first fastening piece and said second fastening piece is immobile.

17. A two-piece fastening system comprising:

a first member and a second member, each said first member and said second member having a hole therethrough, and having a first side and a second side;

a first fastening piece comprising, a bolt having a central axis and including a collar thereabout and extended orthogonally with respect thereto;

a plurality of resilient bolt locking prongs extending longitudinally from said collar of said bolt and parallel to said central axis, each of said plurality of resilient bolt locking prongs having a first end attached to said collar and a second end having a bolt shoulder; and a bolt shank extending axially from said collar, said bolt shank having a plurality of channels therein, each of said plurality of channels having a first end and a second end, and having an opening at said first end and a locking slot at said second end; and a second fastening piece, matable with said first fastening piece in alignment with said central axis and comprising, a nut including a nut body, said nut body having a first side and a second side, and a cavity centrally disposed in at least one of said first side and said second side for receiving said bolt shank;

a plurality of resilient nut locking prongs extending longitudinally from said nut body parallel to said central axis, each of said plurality of resilient nut locking prongs having a first end attached to said nut body and a second end having a nut shoulder; and a plurality of engagement lugs disposed within said cavity in said nut body, said plurality of engagement lugs adapted to slide within said plurality of channels of said bolt shank;

whereupon insertion of said plurality of resilient bolt locking prongs through said hole in said first member to juxtapose said collar with said first side of said first member causes said shoulders of said plurality of resilient bolt locking prongs to engage said second side of said first member thereby anchoring said first fastening piece to said first member;

whereupon insertion of said plurality of resilient nut locking prongs through said hole in said second member to juxtapose said nut body with said first side of said second member causes said shoulders of said plurality of resilient nut locking prongs to engage said second side of said second member thereby anchoring said second fastening piece to said second member;

whereupon alignment of said hole in said first member with said hole in said second member about said central axis and insertion of said bolt shank into said cavity causes said each of said plurality of engagement lugs to be inserted into a said opening at said first end of each of said plurality of channels and to be guided therein toward said locking slot at said second end of each of said plurality of channels; and whereupon entry of said plurality of engagement lugs into each of said locking slot secures said first fastening piece to said second fastening piece; and wherein said first fastening piece and said second fastening piece are each made of a single piece of plastic.

18. A two-piece fastener comprising:
a first fastening piece comprising,
a bolt having a collar, said collar having a first side and a second side;

a screw shank extending from said collar of said bolt, said screw shank adapted to be screwed into a substrate to secure said first fastening piece thereto; and a bolt shank integral with said collar and extending from said first side of said collar, said bolt shank having a plurality of channels therein, each of said plurality of channels having a first end and a second end, and having an opening at said first end and a locking slot at said second end; and a second fastening piece matable with said first fastening piece comprising, a nut including a nut body, said nut body having a first side and a second side, and a cavity centrally disposed in said first side for receiving said bolt shank;

a plurality of resilient nut locking prongs integral with said nut and extending longitudinally from said second side of said nut body, each of said plurality of resilient nut locking prongs including an outwardly facing surface having a slope; and a plurality of engagement lugs disposed within said cavity in said nut body, said plurality of engagement lugs adapted to slide within said plurality of channels of said bolt shank and engage said locking slot.

19. A two piece fastener comprising:
a bolt having a collar, said collar having a first side and a second side;

a bolt shank integral with said collar and extending from said first side of said collar;

a plurality of resilient bolt locking prongs integral with said collar and extending longitudinally from said second side of said collar of said bolt, each of said plurality of resilient bolt locking prongs including an outwardly facing surface having a slope;

a nut including a nut body, said nut body having a first side and a second side, and a nut cavity defined by cavity walls disposed in at least one of said first side and said second side and configured for receiving said bolt shank;

a plurality of resilient nut locking prongs integral with said nut body and extending longitudinally from said second side of said nut body, each of said plurality of resilient nut locking prongs including an outwardly facing surface having a slope;

a plurality of channels disposed on one of said bolt shank and said cavity walls, each of said plurality of channels having a first end and a second end, and having an opening at said first end and a locking slot at said second end;

a plurality of engagement lugs disposed on the other of said bolt shank and said cavity walls, said plurality of engagement lugs adapted to slide within said plurality of channels and engage said locking slot to matably engage said bolt and said nut for fastening said first member to said second member.

* * * * *